United States Patent
Lee et al.

(10) Patent No.: US 12,435,854 B1
(45) Date of Patent: Oct. 7, 2025

(54) BICYCLE STEERING PROMPT SYSTEM

(71) Applicant: EISO ENTERPRISE CO., LTD., Taoyuan (TW)

(72) Inventors: Yi-Hsiung Lee, Taoyuan (TW); Hung-Ching Tu, Taoyuan (TW)

(73) Assignee: EISO ENTERPRISE CO., LTD., Taoyuan (TW)

( * ) Notice: Subject to any disclaimer, the term of this patent is extended or adjusted under 35 U.S.C. 154(b) by 0 days.

(21) Appl. No.: 18/629,152

(22) Filed: Apr. 8, 2024

(51) Int. Cl.
    *F21S 43/19* (2018.01)
    *F21W 103/20* (2018.01)
    *F21W 107/13* (2018.01)

(52) U.S. Cl.
    CPC .......... *F21S 43/19* (2018.01); *F21W 2103/20* (2018.01); *F21W 2107/13* (2018.01)

(58) Field of Classification Search
    CPC .................................................. F21W 2107/13
    See application file for complete search history.

(56) References Cited

U.S. PATENT DOCUMENTS

| | | | | |
|---|---|---|---|---|
| 5,617,303 | A * | 4/1997 | Izzo, Sr. | B62J 6/015 |
| | | | | 340/432 |
| 2018/0079463 | A1 * | 3/2018 | Pearce | B62J 45/412 |
| 2019/0002052 | A1 * | 1/2019 | Chen | B62J 6/015 |
| 2020/0039594 | A1 * | 2/2020 | Ebrahemi | B62K 19/40 |
| 2021/0291919 | A1 * | 9/2021 | They | B60Q 1/2607 |
| 2023/0029461 | A1 * | 2/2023 | Ebrahemi | F21S 41/663 |

FOREIGN PATENT DOCUMENTS

| | | |
|---|---|---|
| TW | 201906759 | 2/2019 |
| TW | 201910173 | 3/2019 |

* cited by examiner

*Primary Examiner* — Eric T Eide
(74) *Attorney, Agent, or Firm* — MUNCY, GEISSLER, OLDS & LOWE, P.C.

(57) ABSTRACT

A bicycle steering prompt system includes a direction light set, a prompt light set and a controller. The prompt light set includes at least two projection lights, and each of the at least two projection lights projecting at least one image upon being activated. The controller is formed a control relationship with the direction light set and the prompt light set, and the controller triggers the prompt light set when triggering the direction light to give a direction prompt, so that one of the at least two projection lights is activated at a side same as the direction light set is triggered. When in implementation of the invention, each of the at least two projection lights projects at least one image on a ground around a rider to give a prompt of a traveling direction where the rider is about to go to people surrounding the rider.

11 Claims, 11 Drawing Sheets

BICYCLE STEERING PROMPT SYSTEM

FIELD OF THE INVENTION

The invention relates to a bicycle lighting system, in particular, a bicycle lighting system provided with a prompt lighting set.

BACKGROUND OF THE INVENTION

TW 201906759A discloses a light projection visual space and safety system for bicycles used to define a distinct safety space. When a ground lighting of a front lighting is tilted at an angle greater than a predetermined angle relative to a vertical line on a ground, the ground lighting of the front lighting emits light as well as projects a first light field or light area in a shape of a cone to a predetermined position close to an underside of a top of a bicycle. When a ground lighting of a rear lighting is tilted at an angle greater than a predetermined angle relative to a vertical line of the ground, the ground lighting of the rear lighting emits light as well as projects a second light field or light area in a shape of a cone to a predetermined position close to an underside of the top of the bicycle to define a distinct safety space.

TW 201910173A discloses a directional warning light device for bicycles provided with an attitude sensor on a circuit board. When the bicycle turns left, the attitude sensor of the direction warning light device generates a left turn signal and transmits to a control unit. After the control unit receives the left turn signal, a left turn projection light set is activated to project a left turn indication sign on the ground to form a left turn direction warning signal to remind vehicles behind.

Although the aforementioned two patent applications provide technical solutions for generating prompts on the ground when turning, however, both patent applications determine whether to provide prompts based on an angle of inclination of a vehicle body upon turning. A tilting of the vehicle body indicates that a vehicle is travelling on a corner or changing a travel path, if a prompt is given at the time, nearby vehicles are difficult to react, thereby the technical solutions provided by both patent applications do not satisfy an actual riding condition, obviously.

SUMMARY OF THE INVENTION

A main object of the invention is to solve the problem of conventional technical solution that determines whether to give a prompt of projection based on a tilting angle of a bicycle body.

In order to achieve the above object, the invention provides a bicycle steering prompt system, including a direction light set, a prompt light set, and a controller. The prompt light set includes at least two projection lights, and each of the at least two projection lights projecting at least one image upon being activated. The controller is formed a control relationship with the direction light set and the prompt light set, the controller triggers the prompt light set when triggering the direction light to give a direction prompt, so that one of the at least two projection lights is activated at a side same as the direction light set is triggered.

In one embodiment, each of the at least two projection lights comprises a housing, the housing is a handle or a handle plug.

In one embodiment, an end of the housing is used to be a projection end by each of the at least two projection lights.

In one embodiment, each of the at least two projection lights comprises a communication module implemented by at least one of protocol as follows ANT+ wireless transmission protocol, Bluetooth wireless transmission protocol, CAN wired communication protocol, and UART wired communication protocol.

In one embodiment, each of the at least two projection lights is controlled by at least one third-party device, other than the controller, through the communication module.

In one embodiment, each of the at least two projection lights comprises a processor and a light projection unit connected to the processor, and the processor controls the light projection unit based on a projection setting data stored therein.

In one embodiment, the projection setting data describes a projection brightness, a blink rate, or a pattern associated with the at least one image.

In one embodiment, each of the at least two projection lights comprises a battery unit.

In one embodiment, each of the at least two projection lights is in a wired connection to the power supply unit.

In one embodiment, each of the at least two projection lights is replaceable by a laser light.

In one embodiment, the controller is connected to two supplement lights of a traveling light supplement system, when the controller triggers the direction light set to give a direction prompt, one of the two supplement lights is activated at a side same as the direction light set is triggered.

Through the foregoing implementation of the invention, compared with the prior art, the invention has the following characteristics: the controller of the present invention controls the direction light set and the prompt light set.

When the vehicle is about to change a path or corner and a rider operates the controller, the direction light set and the prompt light set instantly provide direction prompts and a safe distance warning when the vehicle is shifted, thereby increasing a safety of bicycle activities.

DETAILED DESCRIPTION OF THE PREFERRED EMBODIMENTS

The detailed description and technical content of the invention are described below with reference to the accompanying drawings.

Figure 1:
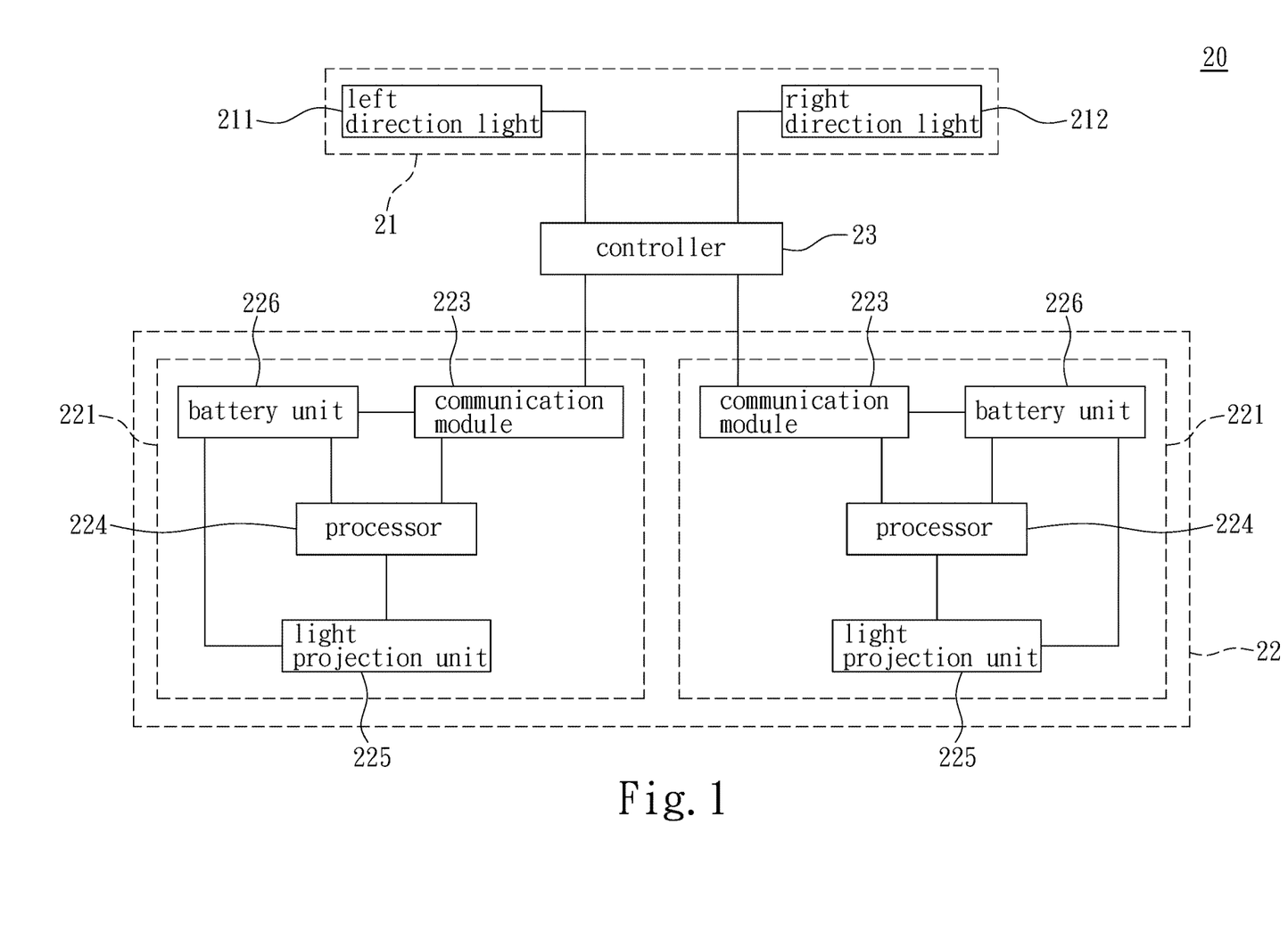
FIG. 1 is a unit diagram I of a bicycle steering prompt system of the invention.

Please refer to FIG. 1. The invention provides a bicycle steering prompt system 20 configured to be disposed on a bicycle body 30. The bicycle steering prompt system 20 includes a direction light set 21, a prompt light set 22, and a controller 23. The direction light set 21 includes a left direction light 211 and a right direction light 212. The left direction light 211 and the right direction light 212 can be independent fixtures or integrated into a single fixture.

Figure 2:
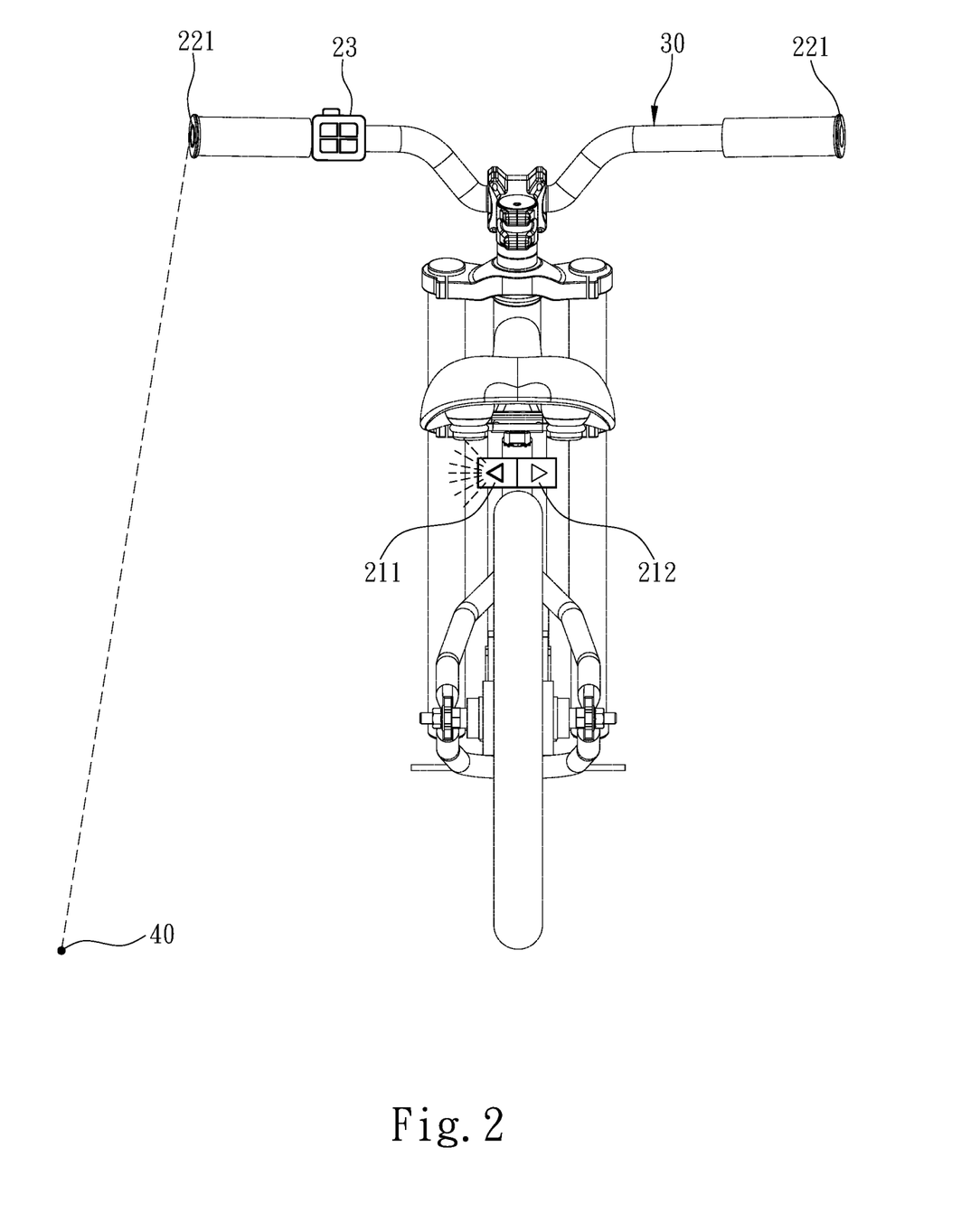
FIG. 2 is an implementation schematic diagram I of the bicycle steering prompt system of the invention.

Please refer to FIG. 1 and FIG. 2. The prompt light set 22 includes at least two projection lights 221 configured to the bicycle body 30, and projection positions of the at least two projection lights 221 are different. For example, one of the at least two projection lights 221 projects toward a right side of the bicycle body 30 when activated, and the other one of the at least two projection lights 221 projects toward a left side of the bicycle body 30 when activated. Further, the at least two projection lights 221 project toward a ground when implemented. Each of the at least two projection lights 221 projects at least one image 40 when activated. Images 40 projected by the at least two projection lights 221 need to be not affected by ambient light or other light sources. Further, in one embodiment, the at least two projection lights 221 adjust a power of a light source based on a current ambient light. The images 40 projected by the at least two projection lights 221 are varied based on the control from other synergistic components, such as changing projection of the images 40 in a blinking manner in response to oncoming vehicles. In one embodiment, each of the at least two projection lights 221 may be replaced by a laser light. A main object of the prompt light set 22 is different from that of the direction light set 21, an object of the direction light set 21 is indicating a direction about to go to vehicles behind by light signals, and an object of the prompt light set 22 is to warn the vehicles behind or neighboring vehicles to keep a distance by clearly presenting a pattern on the ground.

The controller 23 forms a control relationship with the direction light set 21 and the prompt light set 22. Specifically, the controller controls the direction light set 21 and the prompt light set 22. The controller 23, the direction light set 21 and the prompt light set 22 can be connected via wired or wireless. The controller 23 is a device configured to the bicycle body 30, or implemented by a smartphone. The controller 23 triggers the direction light set 21 to give a direction prompt, and triggers the prompt light set 22 simultaneously, so that one of the at least two projection lights 221 is activated at a side same as the direction light set 21 is triggered. Please refer to FIG. 3 and FIG. 4, each of the at least two projection lights 221 is implemented in association with the left direction light 211 or the right direction light 212 of the direction light set 21 located on the same side. For example, one of the at least two projection lights 221 located on the left side of the bicycle body 30 is implemented in association with the left direction light 211, and when the controller 23 controls the left direction light 211 for activation, the controller 23 simultaneously triggers one of the at least two projection lights 221 located on the left side of the bicycle body 30. On the other hand, one of the at least two projection lights 221 located on the right side of the bicycle body 30 is implemented in association with the right direction light 212, and when the controller 23 controls the right direction light 212 for activation, the controller 23 simultaneously triggers one of the at least two projection lights 221 located on the right side of the bicycle body 30.

Figure 3:
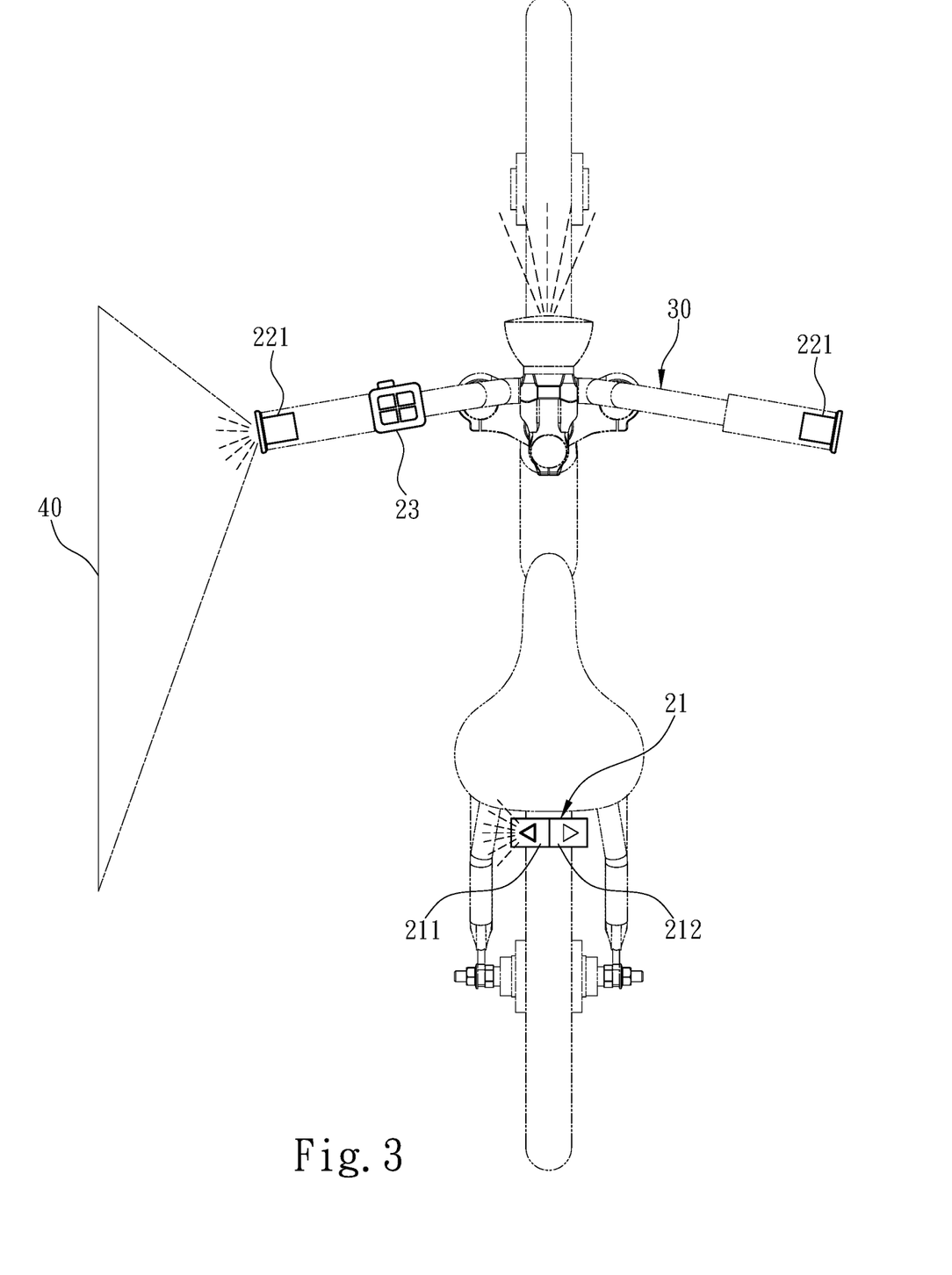
FIG. 3 is an implementation schematic diagram II of the bicycle steering prompt system of the invention.
Figure 4:
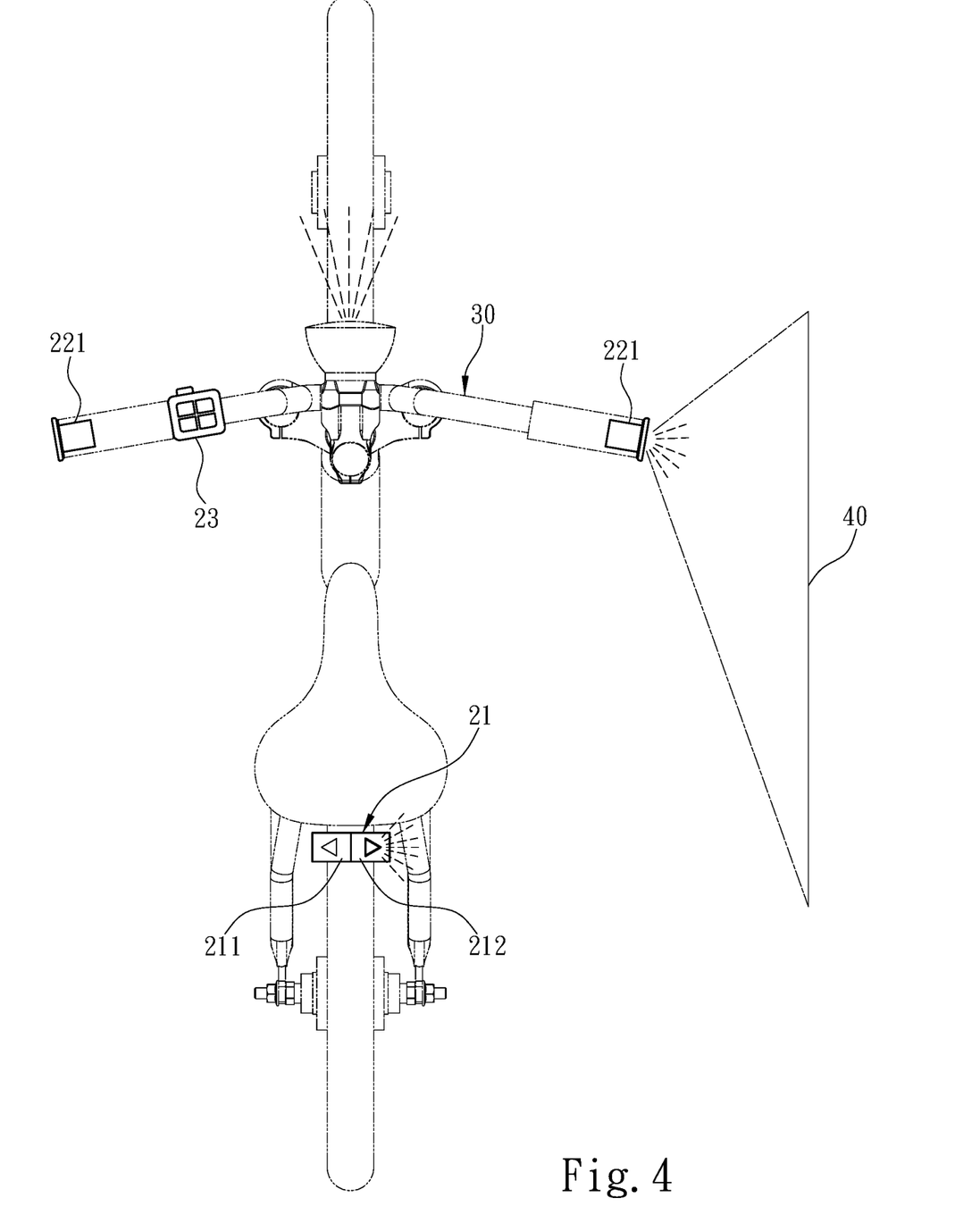
FIG. 4 is an implementation schematic diagram III of the bicycle steering prompt system of the invention.

Accordingly, before the vehicle is about to change a path or corner, the direction light set 21 and the prompt light set 22 instantly give direction prompts and a safe distance warning for the vehicle shifting, when a rider operates the controller 23, thereby increasing a safety of bicycle activities.

Figure 5:
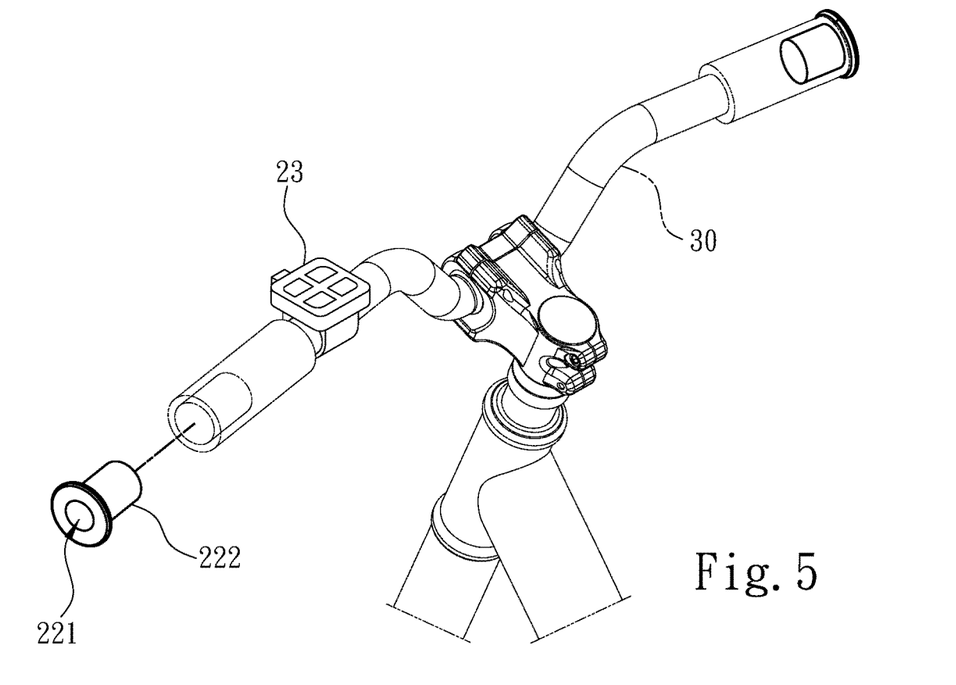
FIG. 5 is a structural schematic diagram I of a projection light of the bicycle steering prompt system of the invention.
Figure 6:
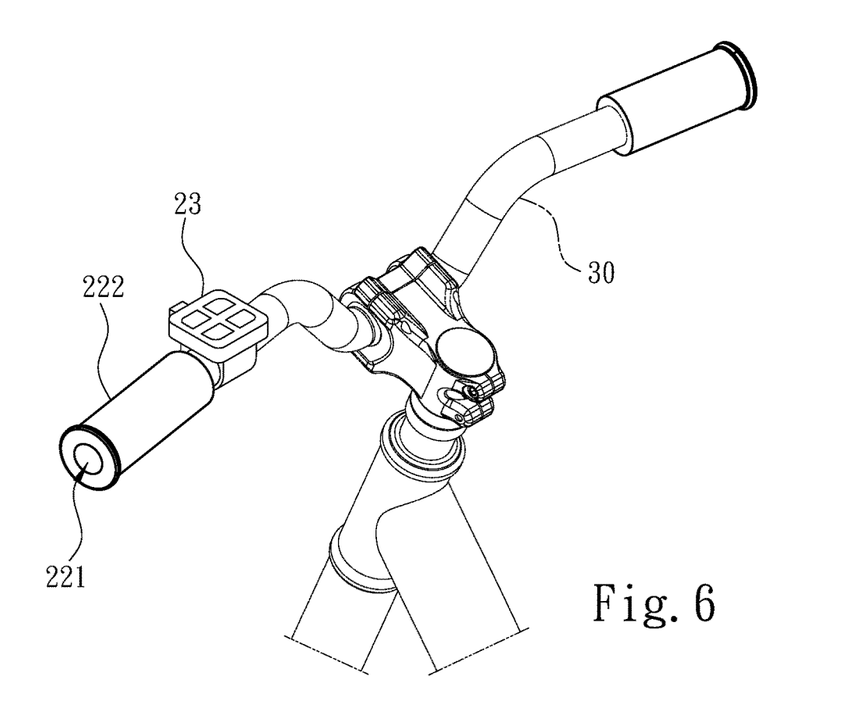
FIG. 6 is a structural schematic diagram II of a projection light of the bicycle steering prompt system of the invention.

Please refer to FIG. 5 and FIG. 6. In an embodiment, each of the at least two projection lights 221 includes a housing 222, which may be a handle plug (as shown in FIG. 5) or a handle (as shown in FIG. 6). In this embodiment, the at least two projection lights 221 are located at handle positions of the bicycle body 30. Further, an end of the housing 222 is used to be a projection end by each of the at least two projection lights 221.

Figure 7:
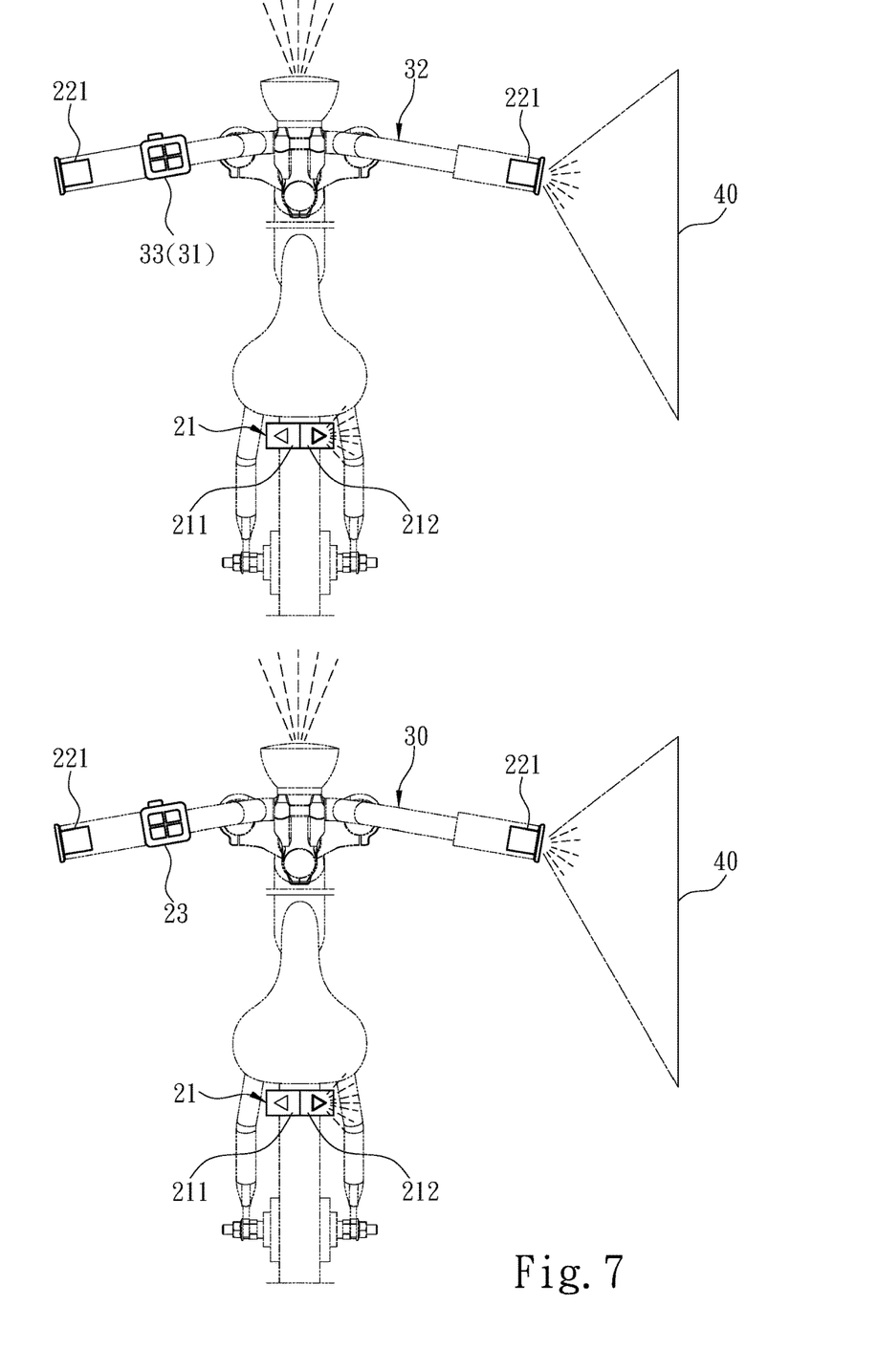
FIG. 7 is an implementation schematic diagram of the bicycle steering prompt system used with groups.

Please refer to FIG. 1, in an embodiment, each of the at least two projection lights 221 includes a communication module 223 implemented by at least one of protocols as follows: ANT+ wireless transmission protocol, Bluetooth wireless transmission protocol, CAN wired communication protocol, and UART wired communication protocol. Please refer to FIG. 7, in an embodiment, the communication modules 223 of each of the at least two projection lights 221 are not limited to communicating with the controller 23, but also communicating with at least one third-party device 31 other than the controller 23. That is to say, each of the at least two projection lights 221 can be controlled by the at least one third-party device 31, other than the controller 23, with communication module 223 owned by itself. The at least one third-party device 31 may be a smartphone, or another controller 33 configured to another bicycle body 32. Accordingly, when a bicycle team where each bicycle is configured with the bicycle steering prompt system 20 travels, the controller 23 on each bicycle may have a communication relationship with prompt light sets 22 on other bicycles, and a master-slave relationship can be further set. When a first rider intends to change a travelling direction, the first rider controls the controller 23 on his bicycle, and the controller 23 on the first rider's bicycle then links and controls all prompt light sets 22 on all bicycles in the bicycle team to give a large scale of prompts through a plurality of projection lights 221, thereby enhancing the safety of the bicycle team upon travelling.

Please refer to FIG. 1, in an embodiment, each of the at least two projection lights 221 includes a processor 224 and a light projection unit 225 connected to the processor 224, the processor 224 controls the light projection unit 225 based on a projection setting data stored therein, so that the light projection unit 225 projects the at least one image 40. Further, the projection setting data describes a projection brightness, a blink rate, or a pattern associated with the at least one image 40. Each of the at least two projection lights 221 receives a modification data published by an external device in response to the projection setting data through the communication module 223. The external device can be connected to the communication module 223 by wired or wireless. The external device may be a smartphone or a computer.

Figure 8:
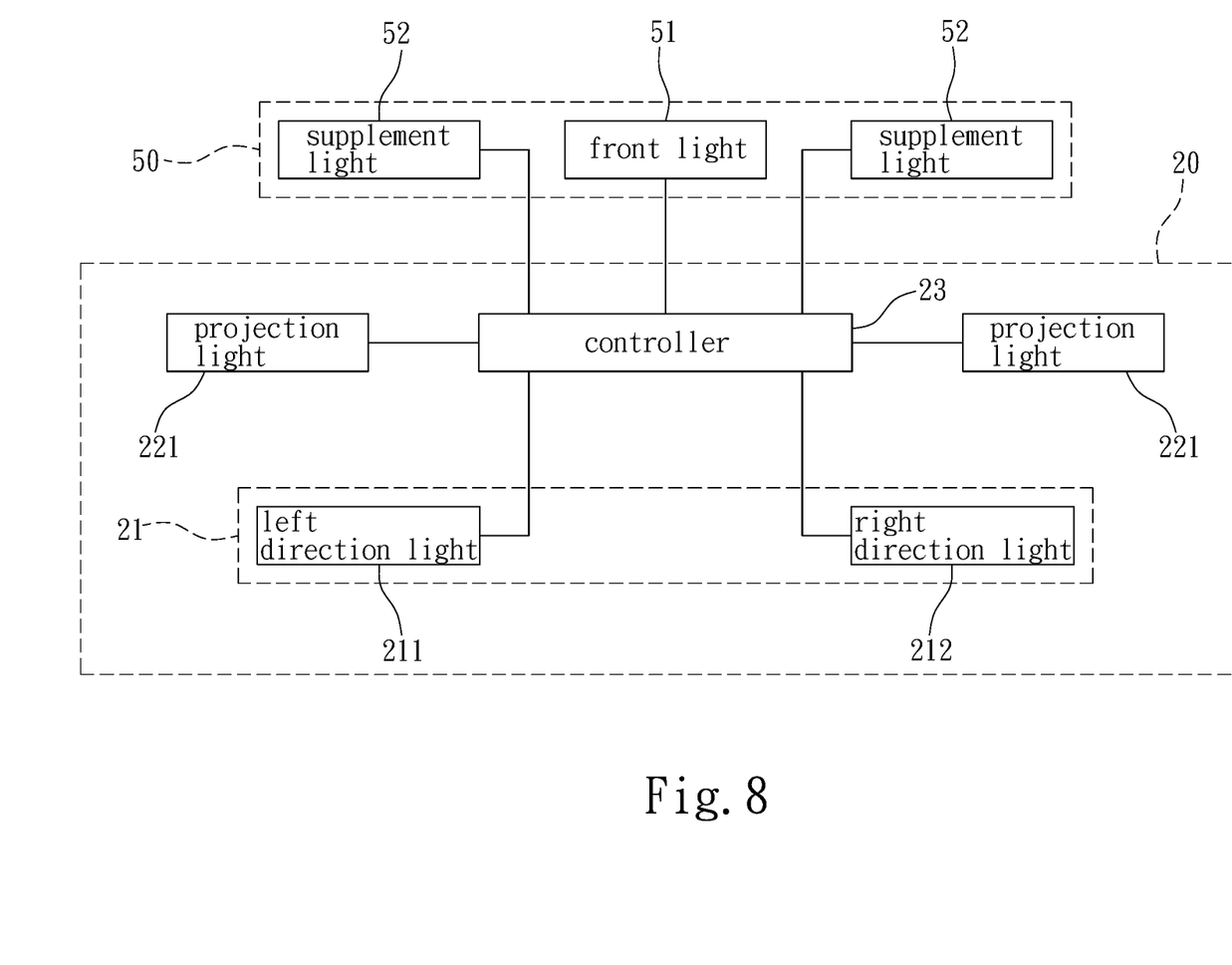
FIG. 8 is a unit diagram of the bicycle steering prompt system in coordinate with traveling light supplement system.
Figure 9:
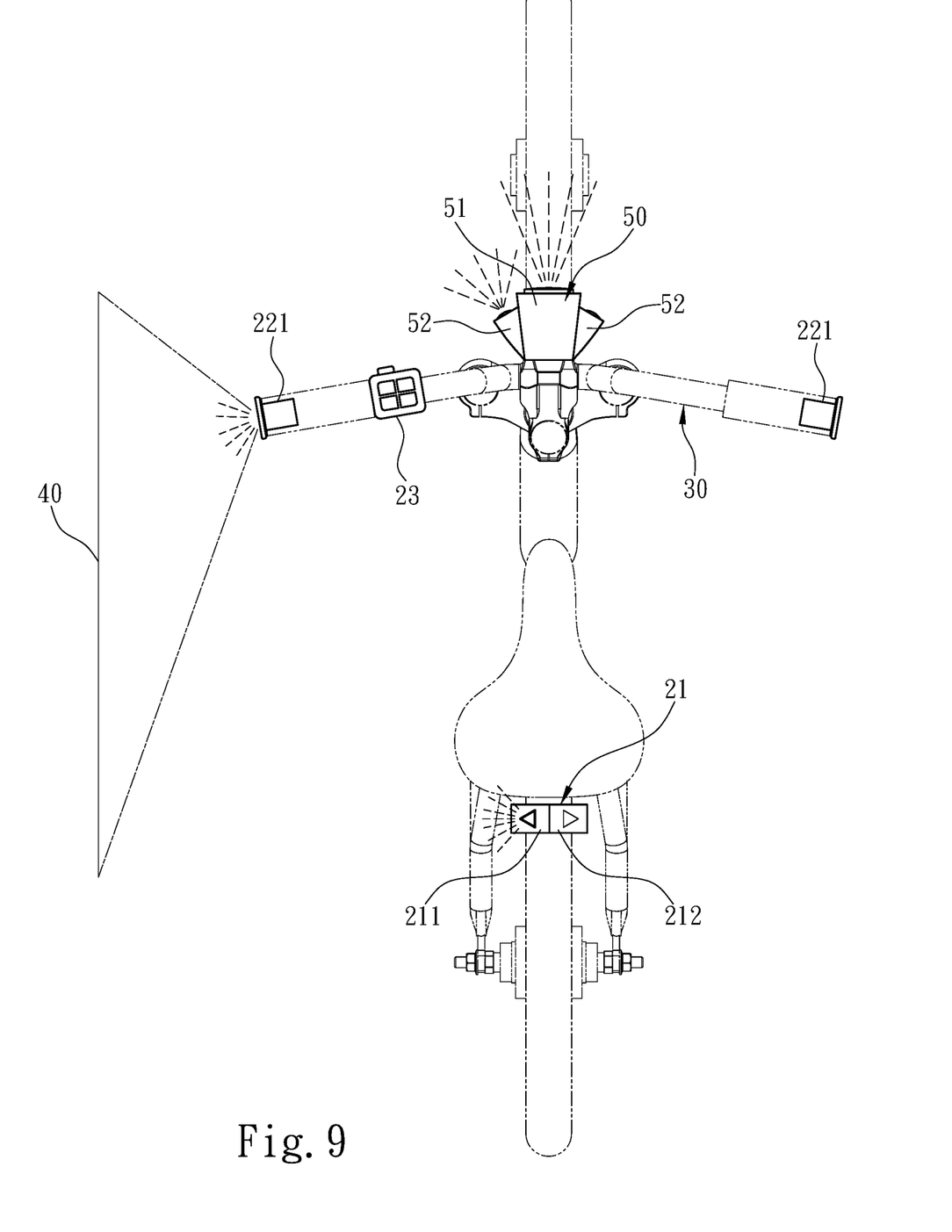
FIG. 9 is an implementation schematic diagram I of the bicycle steering prompt system in coordinate with traveling light supplement system.
Figure 10:
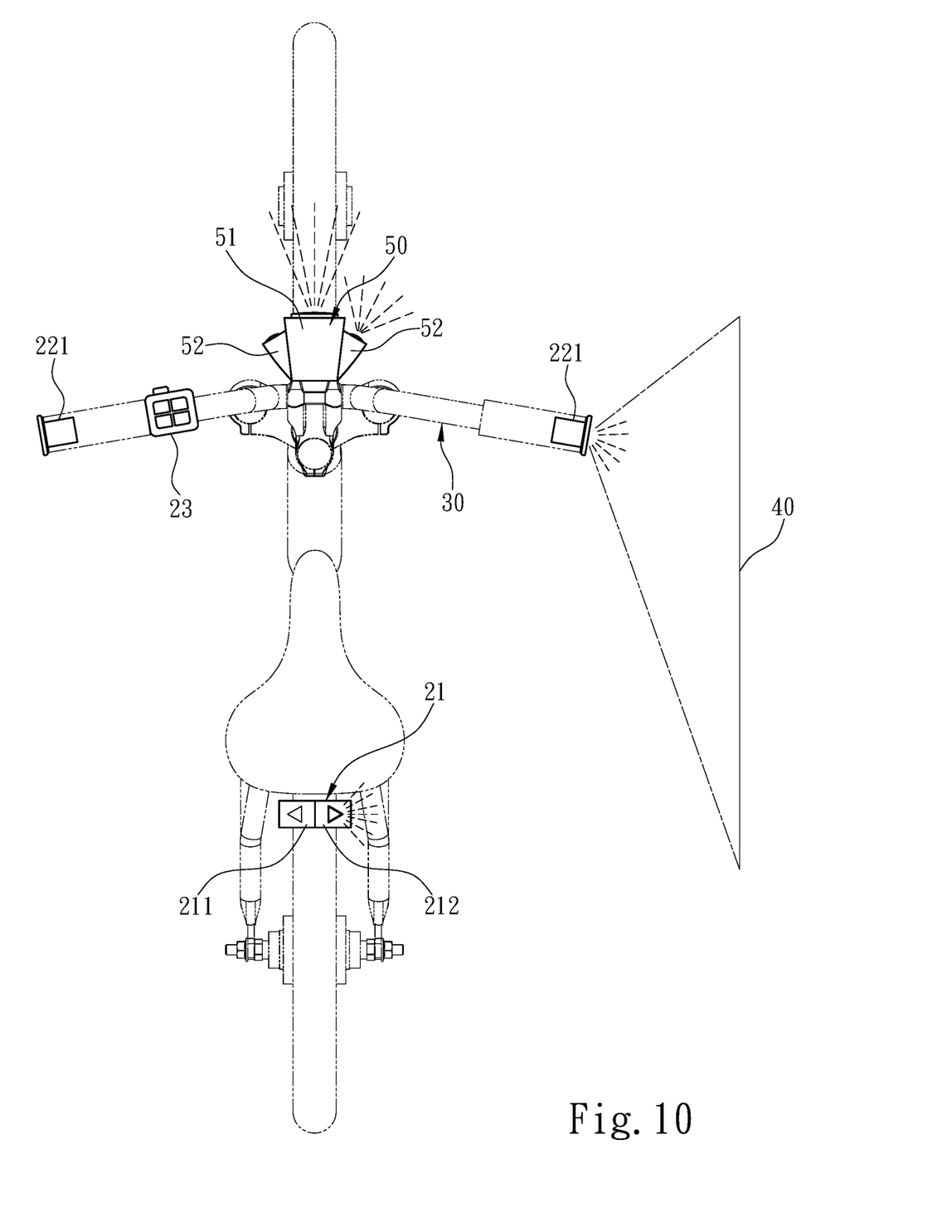
FIG. 10 is an implementation schematic diagram II of the bicycle steering prompt system in coordinate with traveling light supplement system.

Please refer to FIG. 8, in an embodiment, the bicycle steering prompt system 20 works coordinated with a traveling light supplement system 50. The traveling light supplement system 50 includes a front light 51 configured to the bicycle body 30, and two supplement lights 52 configured to the bicycle body 30. The two supplement lights 52 are connected to the controller 23. When the controller 23 triggers the left direction light 211 or the right direction light 212 of the direction light set 21 to give a direction prompt, so that one of the two supplement lights 52 is set to be activated at a side same as the direction light set 21 is triggered. Specifically, the two supplement lights 52 project lights toward two directions, respectively. The two supplement lights 52 provide supplemental illumination in a turning direction when the bicycle body 30 is turning. One of the two supplement lights 52 providing supplemental illumination to the right side of the bicycle body 30 is set to be activated together with the right direction light 212. When the right direction light 212 is activated, one of the at least two projection lights 221 located on the right side of the bicycle body 30 is simultaneously activated, as shown in FIG. 9. One of the two supplement lights 52 providing supplemental illumination to the left side of the bicycle body 30 is set to be activated together with the left direction light 211. When the left direction light 211 is activated, one of the at least two projection lights 221 located on the left side of the bicycle body 30 is simultaneously activated, as shown in FIG. 10.

Figure 11:
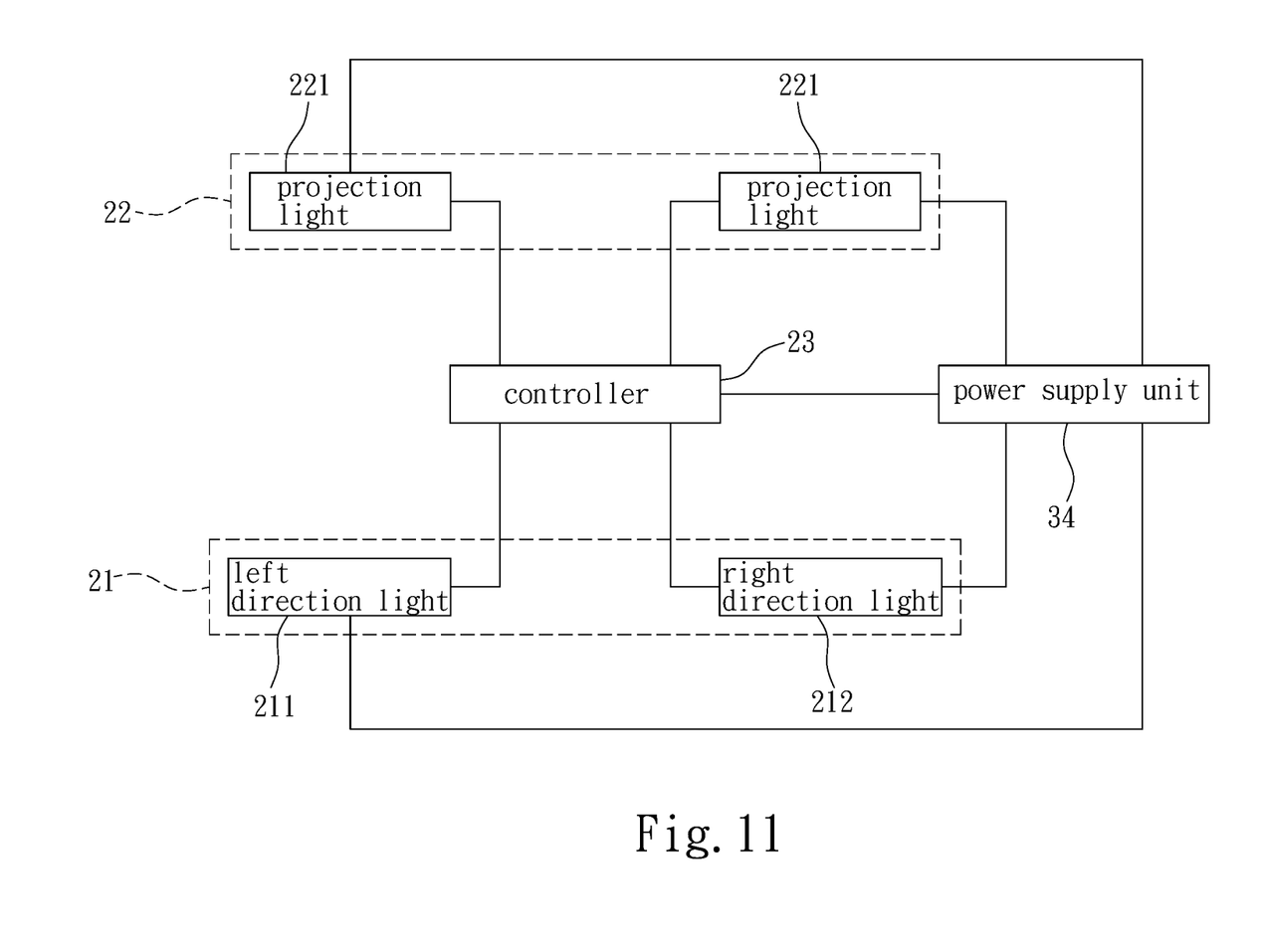
FIG. 11 is a unit diagram II of the bicycle steering prompt system of the invention.
Figure 12:
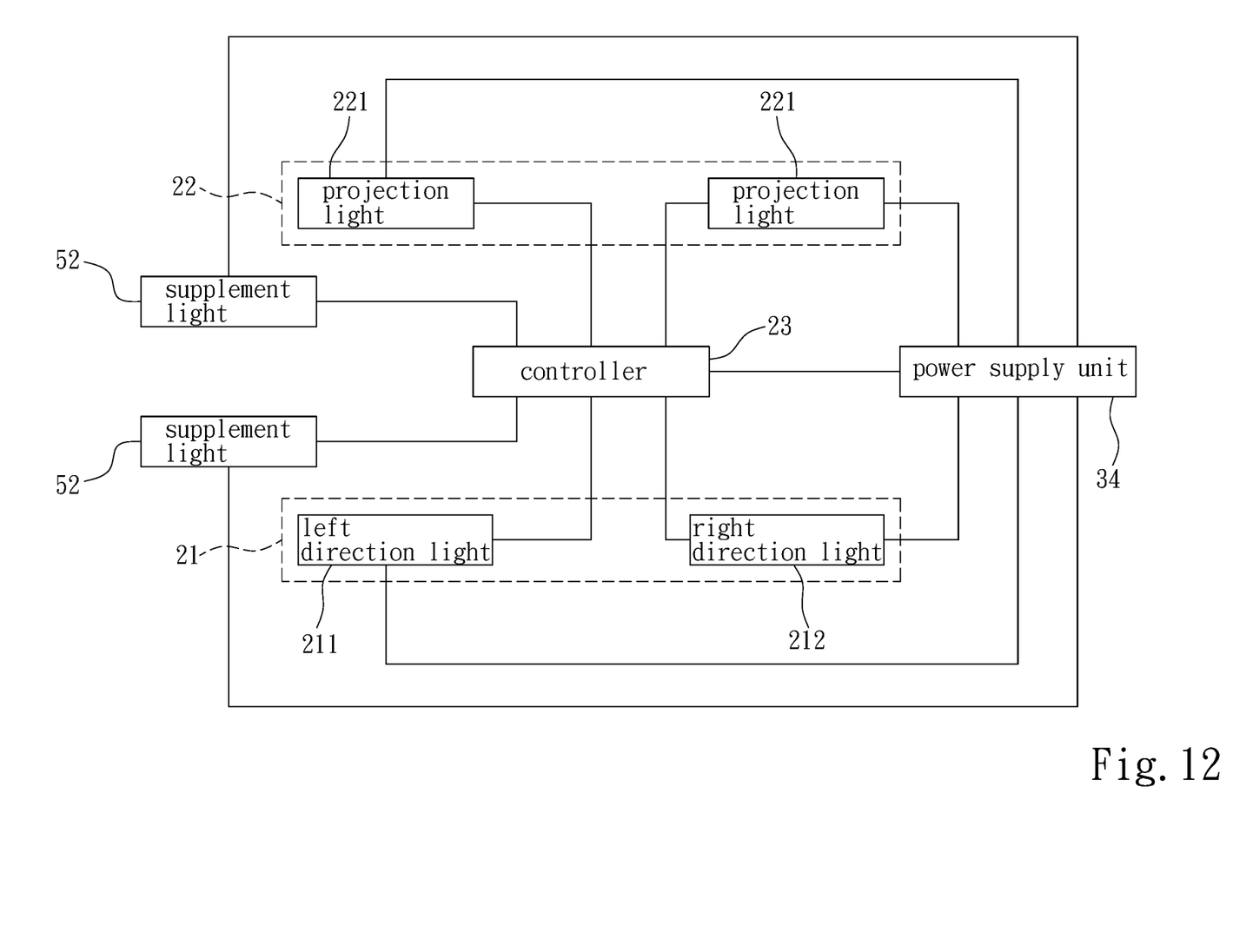
FIG. 12 is a unit diagram III of the bicycle steering prompt system of the invention.

Please refer to FIG. 1, in an embodiment, each of the at least two projection lights 221 includes a battery unit 226 that supplies power for operation. Please refer to FIG. 11 and FIG. 12, in another embodiment, power of each of the at least two projection lights 221 is obtained from a power supply unit 34 of the bicycle body 30, and each of the at least two projection lights 221 is in a wired connection to the power supply unit. In this embodiment, the bicycle body 30 is an electric bicycle (E-bike).

What is claimed is:

1. A bicycle steering prompt system, disposed on a each bicycle in a bicycle team, wherein the bicycle team comprises a leading bicycle and at least one following bicycle, and the bicycle steering prompt system comprising:
    a direction light set, comprising a left direction light and a right direction light;
    a prompt light set, comprising at least two projection lights integrated with a bicycle handle, each of the at least two projection lights comprising a communication module, and each of the at least two projection lights projecting at least one image toward a ground upon being activated; and
    a controller, configured to trigger the direction light set, and configured to trigger the prompt light set by communicating with the at least two projection lights via the communication modules based on a control relationship, wherein the control relationship is defined as when the controller triggers the direction light set, one of the left direction light and the right direction light is activated to provide a direction prompt, and the prompt light set is simultaneously triggered in association with the direction light set to activate one of the at least two projection lights on a side same as one of the left direction light and the right direction light which is activated;
    wherein in the bicycle team, the communication modules of the at least one following bicycle are simultaneously in communication with the controller of the same following bicycle and in communication with the controller of the leading bicycle; and
    wherein the prompt light set of the at least one following bicycle is activated by one of the following:
        the controller of the same following bicycle based on the control relationship; and
        the controller of the leading bicycle based on leader-follower relationship, wherein the leader-follower relationship is defined as when the direction light set of the leading bicycle is triggered, the prompt light set of the following bicycle is simultaneously triggered in association to activate one of the at least two projection lights on a side same as one of the left direction light and the right direction which is activated.

2. The bicycle steering prompt system as claimed in claim 1, wherein each of the at least two projection lights comprises a housing, and the housing is a handle or a handle plug.

3. The bicycle steering prompt system as claimed in claim 2, wherein an end of the housing is used to be a projection end by each of the at least two projection lights.

4. The bicycle steering prompt system as claimed in claim 1, wherein the communication module is implemented by at least one of protocols as follows ANT+ wireless transmission protocol, Bluetooth wireless transmission protocol, CAN wired communication protocol, and UART wired communication protocol.

5. The bicycle steering prompt system as claimed in claim 1, wherein each of the at least two projection lights comprises a processor and a light projection unit connected to the processor, and the processor controls the light projection unit based on a projection setting data stored therein.

6. The bicycle steering prompt system as claimed in claim 5, wherein the projection setting data describes a projection brightness, a blink rate, or a pattern associated with the at least one image.

7. The bicycle steering prompt system as claimed in claim 6, wherein each of the at least two projection lights comprises a battery unit.

8. The bicycle steering prompt system as claimed in claim 1, wherein each of the at least two projection lights comprises a battery unit.

9. The bicycle steering prompt system as claimed in claim 1, wherein each of the at least two projection lights is in a wired connection to a power supply unit.

10. The bicycle steering prompt system as claimed in claim 1, wherein each of the at least two projection lights is replaceable by a laser light.

11. The bicycle steering prompt system as claimed in claim 1, wherein the controller is connected to two supplement lights of a traveling light supplement system, and when the controller triggers the direction light set to give a direction prompt, one of the two supplement lights is activated at a side same as the direction light set is triggered.

* * * * *